No. 666,164.  
Patented Jan. 15, 1901.

J. & W. TITUS.
ROLLER MECHANISM FOR CONVEYER BELTS.
(Application filed May 23, 1900.)

(No Model.)

WITNESSES:

INVENTORS
John Titus
William Titus
BY
James Whitney
ATTORNEY

THE NORRIS PETERS CO., PHOTO-LITHO., WASHINGTON, D. C.

UNITED STATES PATENT OFFICE.

JOHN TITUS, OF OYSTER BAY, AND WILLIAM TITUS, OF NORTH HEMPSTEAD, NEW YORK.

ROLLER MECHANISM FOR CONVEYER-BELTS.

SPECIFICATION forming part of Letters Patent No. 666,164, dated January 15, 1901.

Application filed May 23, 1900. Serial No. 17,643. (No model.)

*To all whom it may concern:*

Be it known that we, JOHN TITUS, residing at Oyster Bay, and WILLIAM TITUS, residing at Old Westbury, in the town of North Hempstead, in the county of Nassau and State of New York, citizens of the United States, have invented certain new and useful Improvements in Roller Mechanisms for Conveyer-Belts; and we do hereby declare that the following is a full, clear, and exact description of the same, reference being had to the accompanying drawings, making a part of this specification, in which—

Figure 1:
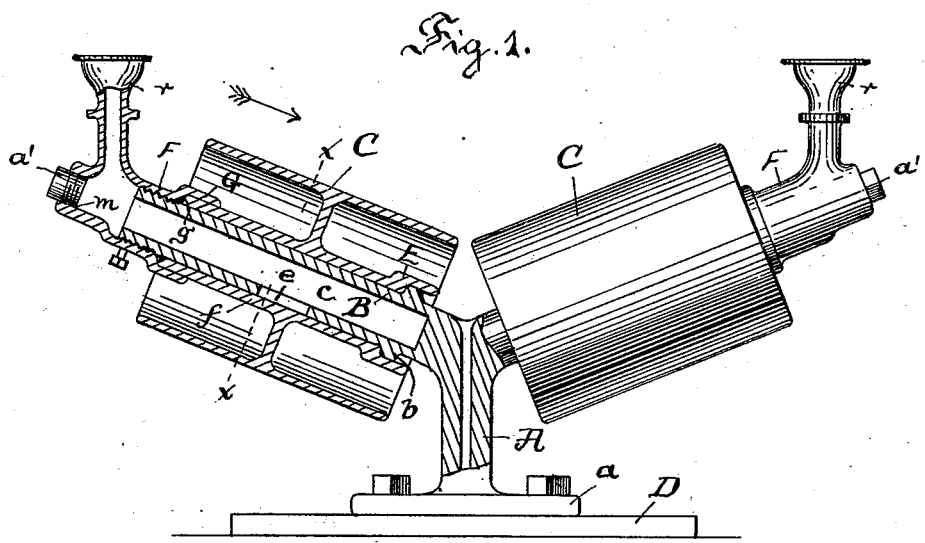
Figure 2:
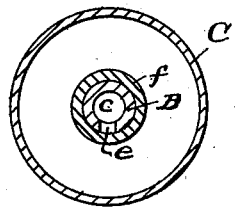

Figure 1 is a side elevation and partial sectional view of mechanisms made according to our invention. Fig. 2 is a vertical transverse sectional view taken in the line $x$ $x$ of Fig. 1.

This invention is designed for use in connection with carrier or conveyer belts which run on systems of pulleys or rollers and which are commonly employed for conveying from one location to another sand, gravel, &c. In such apparatuses the bearings of the pulleys or rollers which support the revoluble endless belts or aprons are especially exposed to the action of sand, grit, &c., which not only destroys the lubricants employed to neutralize friction, but cuts and abrades the bearing-surfaces, so that the pulleys for effective use are speedily destroyed. The object of our invention is to destroy these drawbacks to the economical and efficient operation of conveyer apparatuses; and it comprises a novel combination of parts whereby this object is successfully attained.

In practice duplicate apparatuses placed opposite each other, as shown in Fig. 1, to afford a trough-like cross-section to the carrier-belt in a manner well understood in the art are employed. A description of one of these apparatuses is of course equally a description of the other.

A is a standard which has at its upper end a laterally-extended journal B, which carries the pulley or roller C and which has a foot $a$ by which it is bolted or otherwise fixed to any suitable base D. This journal B has a fillet or circumferential rib $b$ at its lower end and is made tubular, its bore $c$ communicating by a lateral opening $e$ with the bore of the hub $f$ of the roller C. This bore is closed at its lower end and open at its upper end. The lower end of the hub $f$ rests against the fillet $b$ of the journal B, which receives the downward thrust of the hub. Provided upon the said end of the hub is a collar E, which while the end of the hub abuts against the fillet surrounds the latter. The interior of the collar is as close as may be to the circumference of the fillet.

The journal B projects beyond the upper end of the hub of the roller and has fast thereon a tubular cap F, which has a shoulder $g$, which abuts against the adjacent end of the hub and serves to prevent the displacement in an outward direction of the hub from the journal. Provided to and extended forward from this shoulder $g$ is a collar G, which surrounds the adjacent end of the hub, circumferentially embracing it as closely as may be. In the outer end of the cap is an opening $m$, which may be closed by a removable plug $a'$ or otherwise. In the bore of the journal may when desired be placed a lubricator-wick. Lubricating material of any suitable kind may be supplied to said bore through the opening $m$. When desired, a lubricator-cup $r$ may be arranged to communicate with the bore of the journal and supply lubricant thereto. It will be observed that the cap F serves a triple purpose—viz., to supply lubricant to the bore of the journal to lubricate the bearings of the roller to retain the roller against upward displacement on the journal, and by means of its collar G to surround, cover, and protect the adjacent end of the hub of the roller.

In the operation of the apparatus the lubricant passes from the bore of the journal through the opening $e$ to and between the wearing-surface of the journal and the inner or bearing-surface of the hub, while the collar G, by its close relation to the circumference of the hub, and the collar E, by its close relation to the circumference of the fillet $b$, exclude sand, dust, grit, &c., from the surfaces lubricated, as just described, the several parts coöperating to insure the utmost available freedom from friction and consequent wear and tear in the running and operation of the roller under the severe conditions to which it is necessarily subjected when in use, as hereinbefore explained.

What we claim as our invention is—

The combination with a standard having an inclined laterally-extended tubular journal which has a circumferential fillet at its lower end and the bore of which is closed at its lower end and provided with a lateral outlet-opening, of a roller the hub of which abuts against the fillet and has a collar which is extended over and around the fillet, and fast on the extended upper end of the journal and having an inlet-opening, a shoulder which abuts against the upper end of the hub of the roller, and a collar which extends beyond the shoulder over and around the adjacent upper portion of the hub, the whole arranged for joint use and operation, substantially as herein set forth.

JOHN TITUS.
WILLIAM TITUS.

Witnesses:
ERNEST D. TATUM,
ANDREW DURYEA.